Patented May 10, 1949

2,469,354

UNITED STATES PATENT OFFICE 2,469,354

PRODUCTION OF OIL

Donald C. Bond, Northbrook, Ill., assignor to The Pure Oil Company, Chicago, Ill., a corporation of Ohio No Drawing. Application October 24, 1945, Serial No. 624,335

4 Claims. (Cl. 166—22)

This invention relates to a method of treating subterranean oil producing formations for the purpose of increasing flow of oil therefrom.

It is well known to inject gas, such as air or natural gas, into subterranean oil formations for the purpose of increasing flow of oil therefrom. In such operations it is customary to inject the gas under pressure through an injection well located in the center of a producing formation so that the gas will drive the oil from the formation toward the surrounding wells.

I have discovered that the passage of oil through the oil-bearing formation as a result of gas injection can be facilitated if a small amount a readily hydrolyzable substance is contained in the gas, which substance, upon contact with the moisture in the producing formation, hydrolyzes to form a hydrophobic solid the surface of which is wettable by oil but not by water. I have also found that if sufficient hydrolyzable material is added to the injection gas the formation into which the gas is injected can be plugged by the solid which forms upon hydrolysis of the hydrolyzable constituent in the gas. Thus, if it is desired to plug off a water formation in order to facilitate the flow of oil into a well, gas containing the hydrolyzable constituent can be injected into the water-producing formation, thereby plugging it.

One of the objects of the invention is to provide a method for facilitating flow of oil from a producing formation to a producing well.

Another object of the invention is to improve secondary recovery of oil from subterranean formations by gas injection.

A further object of the invention is to provide a method for plugging a subterranean fluid producing formation.

Other objects of the invention will become apparent from the following description.

In accordance with my invention there is incorporated in the gas to be injected into the injection well, such as air, natural gas, or a mixture thereof, a small amount of a substance which readily hydrolyzes upon contact with moisture to form a hydrophobic solid so that the surface thereof is not wettable by water, but is wettable by oil. Where gas injection is practiced for the purpose of driving oil from the producing formation toward producing wells, the injection gas should contain only sufficient of the hydrolyzable substance to form a thin film on the walls of the pores or passages of the producing formation, but insufficient to plug the pores or passages. An amount of hydrolyzable substance ranging from approximately one part to 5,000 to 10,000 parts by volume of gas is sufficient.

Substances which are particularly useful are the halo-silanes containing hydrocarbon groups such as the alkyl chloro-silanes, including monomethyl dichloro-monosilane, dimethyl dichloro-monosilane, methyl trichloro-monosilane, ethyl trichloro-monosilane, propyl trichloro-monosilane, diethyl dichloro-monosilane, dipropyl dichloro-monosilane and methyl ethyl dichloro-monosilane. In general, compounds having the formula $R_aSi_bH_cX_d$, in which R may be alkyl, aryl or aralkyl groups, X is halogen, $a$, $b$ and $d$ are whole numbers, $c$ may be 0 or a whole number, and the valence of Si is 4, are useful provided the compound has a vapor pressure sufficiently high to be carried in the injection gas in the vapor form in the required amount. Compounds such as mono-, di-, tri- and tetra-silane in which part or all hydrogen atoms are substituted by both hydrocarbon groups and halogen may be used provided they are sufficiently volatile. Compounds having a vapor pressure greater than about 0.001 atmosphere at ordinary temperatures are satisfactory for use in secondary recovery operations. Where the invention is used for the purpose of plugging off water formations, the compound should have a vapor pressure of the order of 0.1 atmosphere or greater at ordinary temperature in order that a sufficient quantity may be carried in vapor form in the injection gas to plug the pores of the water producing formation.

Upon injection of the gas containing the halo-silane, or other hydrolyzable compound, into the producing formation, the hydrolyzable compound is hydrolyzed upon contact with water in the producing formation, forming a thin film or surface on the walls of the pores or passages through the rock formation, which film is wettable by oil, but not by water. This surface or film facilitates the passage of oil through the oil-bearing formation during gas injection of the oil, decreasing the flow of water therethrough. Care should be exercised not to use quantities of hydrolyzable substances which will completely clog the pores, except in those cases where it is desired to plug off the formation, as is commonly done in treatment of water-producing formations.

It will be seen, therefore, that I have discovered a novel method for improving secondary recovery of oil by gas injection, and also a novel method of plugging fluid-producing formations in order to prevent the flow of fluid from such formations into a producing well.

It is claimed:

1. The method of increasing the flow of oil from a subterranean oil producing formation containing a plurality of earth bores comprising, injecting into at least one of said bores a substantially dry carrier gas containing about one volume of the vapor of a readily volatile hydrolyzable halo-silane per 5,000 to 10,000 volumes of the dry gas, which vapor upon contact with moisture in the earth formation hydrolyzes to deposit on solid particles comprising the formation a film preferentially wettable by oil.

2. The method in accordance with claim 1 in which the volatile halo-silane has a vapor pressure at least about 0.001 atmosphere at ordinary temperature.

3. The method in accordance with claim 1 in which the halo-silane is dimethyl dichloro-silicomethane.

4. The method in accordance with claim 1 in which the halo-silane is diethyl dichloro-silicomethane.

DONALD C. BOND.

REFERENCES CITED

The following references are of record in the file of this patent:

UNITED STATES PATENTS

| Number | Name | Date |
|---|---|---|
| Re. 21,916 | Vietti et al. | Sept. 30, 1941 |
| 2,265,962 | Bent et al. | Dec. 9, 1941 |
| 2,306,222 | Patnode | Dec. 22, 1942 |